United States Patent [19]

Okutani et al.

[11] Patent Number: 4,971,442

[45] Date of Patent: Nov. 20, 1990

[54] PHOTOELECTRIC POSITION ENCODER USING DIFFRACTION IMAGERY

[75] Inventors: Norio Okutani, Neyagawa; Tomiyasu Ueda, Hirakata; Tomohiro Maruo, Katano, all of Japan

[73] Assignee: Matsushita Electric Industrial Co., Ltd., Kadoma, Japan

[21] Appl. No.: 342,609

[22] Filed: Apr. 20, 1989

Related U.S. Application Data

[63] Continuation of Ser. No. 898,560, Aug. 21, 1986, abandoned.

[30] Foreign Application Priority Data

| Aug. 23, 1985 | [JP] | Japan | 60-185211 |
| Oct. 11, 1985 | [JP] | Japan | 60-227102 |
| Jun. 18, 1986 | [JP] | Japan | 61-142022 |

[51] Int. Cl.$^5$ .............................. G01B 9/02
[52] U.S. Cl. .................... 356/356; 356/363; 250/237 G; 250/231.16
[58] Field of Search ............ 356/356, 358, 363; 250/231 SE, 237 G

[56] References Cited

U.S. PATENT DOCUMENTS

| 3,427,463 | 2/1969 | Weyrauch | 250/237 G |
| 3,842,261 | 10/1974 | MacGovern et al. | 250/237 G |
| 4,112,295 | 9/1978 | Dubik et al. | 250/237 G |
| 4,326,128 | 4/1982 | Klein | 250/231 SE |
| 4,395,124 | 7/1983 | Remijan | 250/237 G |

OTHER PUBLICATIONS

A. H. McIlraith, "An Introduction to the Theory of Crossed Diffraction Gratings and Their Application to Linear Measurement", Machine Shop Magazine; Apr. 1962, pp. 202-213.

Primary Examiner—Davis L. Willis
Assistant Examiner—S. A. Turner
Attorney, Agent, or Firm—Cushman, Darby & Cushman

[57] ABSTRACT

A photoelectric position encoder using diffraction imagery has a laser light source emitting parallel, coherent light. As least one light sensing device senses the light amount received from the light source and provides an output signal corresponding thereto. A transfer slit plate having periodic slits is disposed between the light source and the light sensing device. The light sensing device thus senses the variation in the received light amount caused by the movement of the transfer slit plate. The light sensing device also senses brightness and darkness fringes of a diffraction image caused by the periodic slits of the transfer plate. Circuitry is coupled to the light sensing device and issues a position signal corresponding to the position of the transfer slit plate.

20 Claims, 5 Drawing Sheets

PHOTOELECTRIC POSITION ENCODER USING DIFFRACTION IMAGERY

This is a continuation of application Ser. No. 06/898,560, filed Aug. 21, 1986, and now abandoned.

FIELD OF THE INVENTION AND RELATED ART STATEMENT

1. Field of the Invention

The present invention is generally related to a position detecting device of a positioning apparatus, and particularly to a position detecting device using a photoelectric type device.

2. Description of the Related Art

Positioning apparatus for positioning a mechanical member by detecting a rotary angle of the mechanical member is well known. A photoelectric type encoder is widely used as the position detecting device. One example of the conventional photoelectric type encoder is described as follows.

FIG. 8 is a perspective view showing the conventional photoelectric type encoder. As shown in FIG. 8, the photoelectric type encoder comprises a light source 1, a collimator lens 2, a revolution disk 3, a fixed mask 4, light receiving elements 5 and waveform shaping circuitry 6.

The photoelectric type encoder operates as mentioned below. The flux of light emitted from the light source 1 is made parallel by the collimator lens 2. The parallel light penetrates slits of the revolution disk 3 and slits of the fixed mask 4. The light is then photoelectrically converted by the light receiving elements 5. The photoelectrically-converted signal is applied to the waveform shaping circuit 6. When the revolution disk 3 rotates corresponding to a rotation of a shaft of the mechanical member, the accord and the discord of the slit of the revolution disk 3 and the slit of the fixed mask 4 are repeated. Therefore, a sine wave signal or the like is issued from the waveform shaping circuit 6. The rotation angle of the shaft is detected by using the sine wave signal. Hitherto, filament lamps and light emitting diodes have been used as the light source of such known photoelectric encoders.

It is known that a constant distance between the revolution disk and the fixed mask should be maintained for scanning the regular periodic slits of the revolution disk. And the constant distance can take various lengths as mentioned below.

When the parallel light penetrates the slits of the revolution disk 3, a diffraction image of the slit of the revolution disk 3 is produced on a certain virtual plane behind the slits plane of the revolution disk 3 by the interference of the diffracted light caused by the slits of the revolution disk 3. The diffraction image can be scanned, for example, by the slits of the fixed mask 4 which has the same grating constant (period) as that of the slits of the revolution disk 3. The certain virtual plane is produced at a distance of $n.P_M^2/\lambda$ ($n=0, 1, 2, \ldots$) from the slit plane of the revolution disk 3 under the condition that the grating constant (period) of the slits of the revolution disk 3 is represented by $P_M$ and the wave-length of the light is represented by $\lambda$. Therefore, the optimum electrical scanning signal is obtained when the slit plane of the fixed mask 4 is at a distance of $n.P_M^2/\lambda$ from the slit plane of the rotational disk 3. An error within $\pm 0.1 P_M^2/\lambda$ is allowed (Machine Shop Magazine, pp. 208, April, 1962)

FIG. 9 is a diagram of the amplitude I of the sine wave signal which is obtained by the movement of the revolution disk 3, at a distance L between the revolution disk 3 and the fixed mask 4.

However, complete parallel light flux is not obtained since the luminous area of the filament lamp or a light emitting diode is large. Therefore, the diffraction image of the revolution disk slits becomes obscure on the fixed mask 4 because of the inferior parallelism and the wide wavelength band. Accordingly, the distance L between the revolution disk 3 and the fixed mask 4 cannot be made large; that is, the distance L is generally given by $L \leq P_M^2/\lambda$. When $P_M$ is minute, the slits are liable to be polluted or destroyed because of the presence of dust, etc.

The width of the slit is generally not more than ½ of the grating constant (or slit period), namely, 0.45 to 0.5. Therefore, at a place where L is $(n-\frac{1}{2}).P_M^2/\lambda$, the amplitude of the obtained sine wave signal becomes almost zero. Therefore, the amplitude of the sine wave signal largely varies corresponding to the fluctuation of distance L. Then, it is necessary to make the fluctuation of the distance L small in order to very stably detect the position.

In the conventional photoelectric encoder, in order to resolve the above-mentioned problems, the flatness of the revolution disk 3 and the precision of the revolution disk bearing are improved, thereby suppressing the fluctuation of the distance L and miniaturizing the size of the encoder and realizing a high resolution. However, the photoelectric encoder must be manufactured as a precision measuring instrument since the temperature condition and the load condition of the revolution disk bearing are strictly restricted. Therefore, the known photoelectric encoder is not adequate for general industrial use.

Otherwise, conventional encoders are known which produce relatively parallel light flux by using a filament lamp producing a large amount of light and a collimator lens having a long focal length, thereby improving the obscurity of the slit diffraction image. Such conventional encoders attain a high resolution and suppress the bad influence of the fluctuation of the distance L, but are disadvantageous in that such a filament lamp is weak against vibration or shock and has an inferior life. Further, the use of a long focal length line for obtaining high parallel light flux induces a large luminocity into the system, and therefore this known encoder is also not adequate for general industrial use.

As mentioned above, the conventional photoelectric encoder has such problems that miniaturization and high resolution is difficult to realize for general industrial use.

OBJECT AND SUMMARY OF THE INVENTION

The present invention intends to resolve the above-mentioned problems of the conventional photoelectric encoder, thereby offering a position detecting device having a small size and superior resolution.

The position detecting device of the present invention comprises:

a light source having a laser light source to produce coherent light;

at least one light sensing device for sensing light from the light source, a transfer slit plate having periodic slits, disposed between the light source and the light sensing device, the light sensing device (a) sensing the variation of light amount caused by the movement of the transfer slit plate, and (b) sensing brightness and darkness fringes of a diffraction image caused by at least two periodic slits of the transfer slit plate; and a circuit for issuing a signal corresponding to the position of the transfer slit plate based on the output of the light sensing device.

Further, the position detecting device may comprise:

a light source having a laser light source for emitting coherent light and comprising a light source of size (S) (as shown in FIG. 3, (S) is a width of the light source in a width direction of the slits of the slit plates), and a collimator lens of focal length (F), two slit plates disposed between the light source and the light sensing device, and having periodic slits, a light sensing device for sensing the variation of the amount of light emitted from the light source and passing through the two slit plates, the variation being induced by movement of one of the slit plates, and for sensing brightness and darkness fringes of a diffraction image induced by at least two periodic slits of the slit plate which is disposed on the light source side through the periodic slits of the slit plate disposed at the light sensing device side, a slit distance ($d_1$) of the periodic slits of the slit plate at the light source side and a slit distance ($d_2$) of the periodic slits of the slit plate at the light sensing device side having such a relation that $$d_1 > d_2 \text{ and } d_2 = \frac{d_1}{n} \text{ ($n$: integer), and}$$

a ratio of $S/F$ being given by $S/F \leq d_2/2L$, wherein (L) is the distance between the periodic slits of the slit plate on the light source side and the periodic slits of the slit plate on the light sensing side such that the width of the main maximum of the Fraunhofer diffraction image is not more than ½ of the slit distance ($d_2$) of the periodic slits of the slit plate on the light sensing device side, and a circuit for obtaining the position of the transferring plate by using the output of the light sensing device.

DESCRIPTION OF THE PREFERRED EMBODIMENTS

Figure 1:
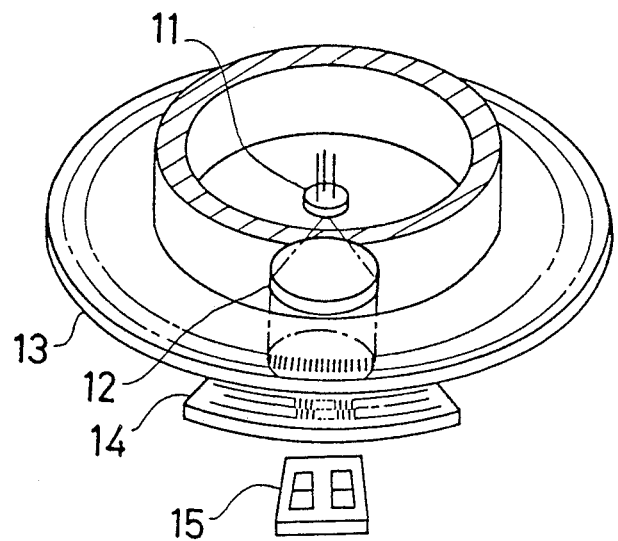
FIG. 1 is a perspective view showing a position detecting device of an embodiment of the present invention.

An embodiment of a position detecting device of the present invention is described as follows referring to the figures. FIG. 1 is a perspective view showing the embodiment of the position detecting device of the present invention. The position detecting device comprises a laser diode 11, a collimator lens 12, a transfer slit plate 13, a fixed slit plate 14 and a light sensing element 15.

An optical mechanism of the position detecting device having the above-mentioned constitution operates as follows.

Figure 2:
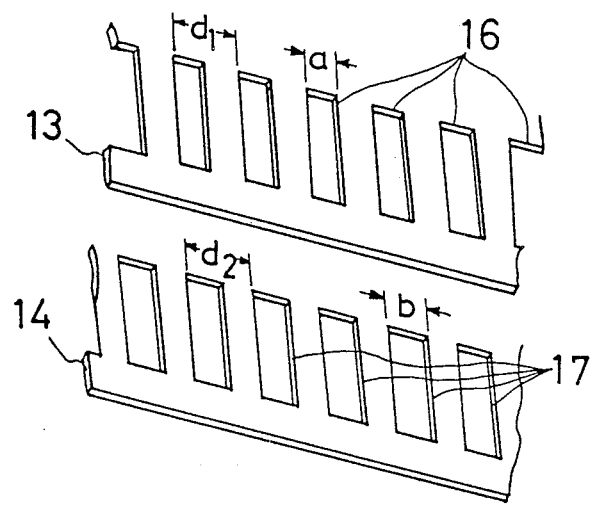
FIG. 2 is an enlarged perspective view showing a slit part of the position detecting device of the embodiment in FIG. 1.

As shown in FIG. 1, laser diode 11 is disposed at a focal point of the collimator lens 12. Coherent light emitted from the luminous face of the laser diode 11 is made parallel by the collimator lens 12 and is irradiated on the transfer slit plate 13. As shown in FIG. 2, a great many fine slits 16 of width (a) are made at intervals of distance ($d_1$) (grating constant or period of slits) on the transfer slit plate 13. The light penetrates the slits 16 but is obstructed by the parts between the slits. The penetrating light is irradiated on the fixed slit plate 14.

The sensing element 15 has four parts corresponding to the four slits groups of the fixed slit plate 14. The slits groups are out of phase with each other in order to suppress noise and so on as known in the prior art.

The Fraunhofer diffraction image of the light of wavelength ($\lambda$) penetrating the slits 16 is considered as being produced by a combination of a regular arrangement of the same openings and the rectangular single opening, since the slits 16 can be considered to be made by regularly disposing an extremely great many slit openings, each having the same rectangular shape. It is supposed that in FIG. 3, the direction of the slit 16 is parallel with an axis (y) and the center of the slit 16 is regularly disposed at intervals of distance ($d_1$) on the axis (x). When the light source (s) is a slit which is parallel with an axis ($Y_1$) on an $X_1 - Y_1$ plane and a center of which is on an axis ($X_1$), a diffraction image (P) comprises narrow width strips which are parallel with an axis ($Y_2$) and the center of which strips are on an axis ($X_2$). The intensity distribution I(P) of the diffraction image is represented by $$I(P) = I_0(P)|F(P)|^2 \qquad (1).$$

Where $I_0(P)$ is the intensity distribution of the diffraction image made by the rectangular single opening.

$I_0(P)$ is given by $$I_0(P) = I_0(P_0) \frac{\sin^2 \pi \alpha}{(\pi \alpha)^2}, \qquad (2)$$

$$\alpha = \frac{a}{\lambda}(\sin \theta_1 + \sin \theta_2), \qquad (3)$$

Figure 3:
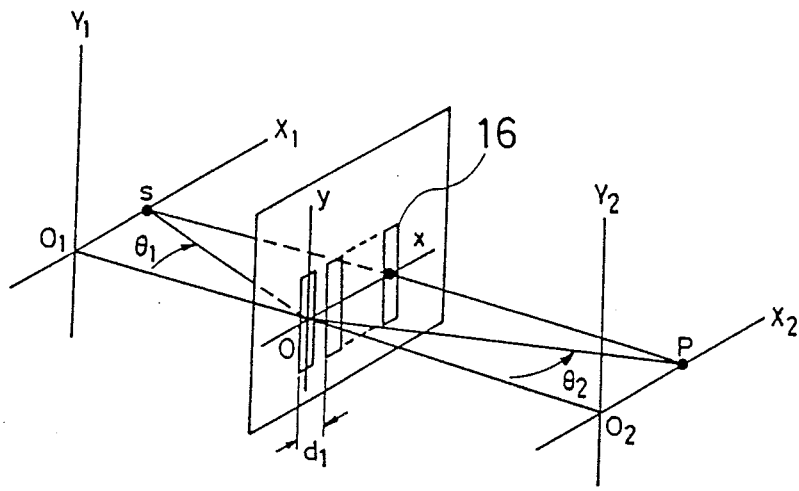
FIG. 3 is a perspective view showing the positional relationship of a Fraunhofer diffraction image.

$\theta_1$: angle from the light source against a zero-th slit of the regular arrangement of the same openings as in FIG. 3, $\theta_1$: angle from the image point against the zero-th slit of the regular arrangement of the same openings as in FIG. 3.

And where $|F(P)|^2$ is a relative intensity distribution of the diffraction image caused by the same openings of N number which are disposed at intervals of distance ($d_1$) on the axis (x) with the first opening being disposed at a point of origin (0).

$|F(P)|^2$ is represented by $$|F(P)|^2 = \frac{\sin^2 N\pi\delta}{\sin^2 \pi\delta},\quad (4)$$

where $$\delta = \frac{d_1}{\lambda}(\sin\theta_1 + \sin\theta_2). \quad (5)$$

Figure 4:
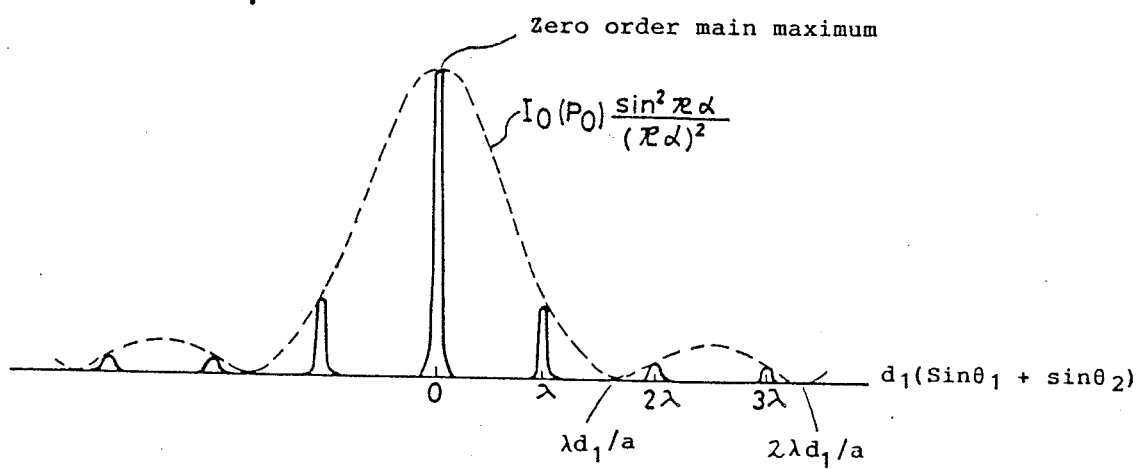
FIG. 4 is a diagram showing a light intensity distribution of the Fraunhofer diffraction image caused by a combination of a regular arrangement of the same openings and a rectangular single opening.

FIG. 4 is a diagram showing a relation between the I(P) in the formula (1) and the $d_1(\sin\theta_1+\sin\theta_2)$ in the $|F(P)|^2$, when the light source is a monochromatic light of wavelength ($\lambda$) (Kogaku Gijutsu handbook (Asakura Shoten)).

Here, the laser diode 11 is used as the light source and the light is made parallel by the collimator lens 12. Therefore, the above-mentioned formulas (3) and (5) are respectively represented as $$\alpha = \frac{a}{\lambda}\sin\theta_2, \quad (6)$$

and $$\delta = \frac{d_1}{\lambda}\sin\theta_2. \quad (7)$$

Then, the conditions for the appearance of main maximum are, $$d_1 \sin\theta_2 = m\lambda (m=0, \pm1, \pm2 \ldots) \quad (8).$$

The width of the main maximum is 2/N of a distance between the main maximums. The width becomes narrower and the main maximum becomes sharper corresponding to the increase of N. As shown in FIG. 4, a dotted line connecting the main maximum of each order of $|F(P)|^2$ shows a distribution of $I_0(P)$ of the rectangular single opening.

The Fraunhofer diffraction image caused by at least two slits 16 is projected on the fixed slit plate 14. As shown in FIG. 2, a great many slits 17 of width (b) are arranged at intervals of distance ($d_2$) which is equal to ($d_1$) on the fixed slit 14. The light penetrates at parts of the slits 17 and is obstructed at other parts. The penetrating light is radiated on the light sensing element 15.

When the distance between the main maximums of the Fraunhofer diffraction image projected on the fixed slit plate 14 is equal to the distance $d_2$ of the slit 17 formed on the fixed slit plate 14, that is, the peak of the main maximum is almost within the slit 17, the amplitude of the detected signal issued from the light sensing element 15 becomes maximum.

Now, the distance (period) between the main maximums of the Fraunhofer diffraction image, is uneven on the fixed plate 14. That is, the higher the order is, the longer the distance is. Further, the higher the order is, the smaller the intensity is. Thus, based on the above-mentioned uneven distances and the smaller intensity, the order of the main maximum, which is to be taken into consideration, is determined from a point of practical use. The main factor in determining the amplitude of the detected signal is the ratio of the distance ($d_1$) between the slits 16 against the width (a). A typical example is $d_1=2a$. In the example, the intensity of the main maximum of the second or higher order is about 1/22 or less of the main maximum of zero-th order. Therefore, the main maximum of the second or higher order can be neglected, and the amplitude of the detected signal is considered enough when the peak of the main maximum of the zero-th and first order lie within the slit 17.

Here, the intensity of the main maximum of each degree of the Fraunhofer diffraction image is determined by the ratio of the distance ($d_1$) of the slits 16 against the opening width (a) of the slit 16. The smaller the ($d_1/a$) is, the smaller the main maximum of the first or greater order is. For the smaller ($d/a$), that is, for the large value of (a), the main maximum of lower degree can be ignored.

Another factor determining the amplitude of the detected signal is the size (S) of the light source. In FIG. 3, the light source (s) is considered as a point light source, but in practical example the light source (s) has a size (S) and is disposed at an optical infinite distance by disposing the light source at the focal point of a collimator lens of focal length (F). Therefore, the light source is considered as a set of point light sources and it can be considered that the point light sources are distributed within an angle of S/F at an infinite distance. Therefore, the Fraunhofer diffraction image of the slit 16 has a spread angle of approximately S/F.

Another factor determining the amplitude of the detected signal is a distance between the transfer slit plate 13 and the fixed slit plate 14. The distance is liable to vary, and therefore the distance between the main maximums of the Fraunhofer diffraction image varies. At such distance, when the average distance between the main maximum of the zero-th order and the main maximum of the first order is made equal to the distance ($d_2$) of the slit 17, the extent of possible variation of the distance between the transfer slit plate 13 and the fixed slit plate 14 becomes largest. When the distance between the main maximum of zero-th order and the main maximum of first order is equal to the distance ($d_2$) of the slit 17, the distance L between the transfer slit plate 13 and the fixed slit plate 14 is determined as follows:

By making in formula (8), $$m=1 \quad (9)$$

and $$\sin\theta_2 \approx \tan\theta_2 \frac{d_1}{L} \quad (10)$$

$$L = \frac{d_1^2}{\lambda} \quad (11)$$

is given.

When the distance between the main maximum of the zero-th order and the main maximum of first the Fraunhofer diffraction image is ($Md_1$) (where (M) is a positive integer), the width (w) of the main maximum is given by $$w = \frac{2MD_1}{N}. \quad (12)$$

Under the condition that the main maximum width (W) determined by the (N) and (M) does not exceed ½ of the distance of the slits 17, that is, under the condition of $$N \geq 4M \quad (13),$$

the amplitude of the detected signal is enough. Thus, the distance (L) is given by $$L = M \cdot \frac{d_1^2}{\lambda}. \quad (14)$$

The practical width (w) of the main maximum has a relation to the size (S) of the light source and the focal length (F) of the collimator lens. The width (w) is given by $$w = \frac{2Md_1}{N} + \frac{SL}{F}. \quad (15)$$

Figure 5:
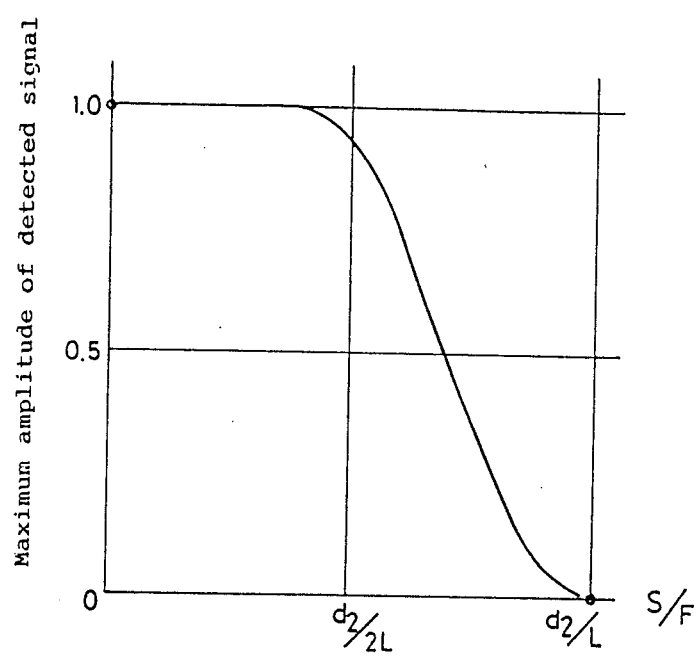
FIG. 5 is a diagram showing a relation between S/F and maximum amplitude.

Under the condition that the (N) is large enough and the width (w) of the main maximum does not exceed ½ of the distance of the slits 17, that is, under the condition $$\frac{S}{F} \leqq \frac{d_1}{2L}, \quad (16)$$

the amplitude of the detected signal is large enough. FIG. 5 shows the relation of the variation of the maximum amplitude of the detected signal against the variation of S/F.

Next, the amplitude variation of the detected signal caused by the variation of distance (L) between the transfer slit plate 13 and the fixed slit plate 14, is not equal to an integer times the slit distance ($d_1$) and the amount of the amplitude variation of the detected signal is dependent on the intensity of the main maximum of first or higher order.

Figure 6:
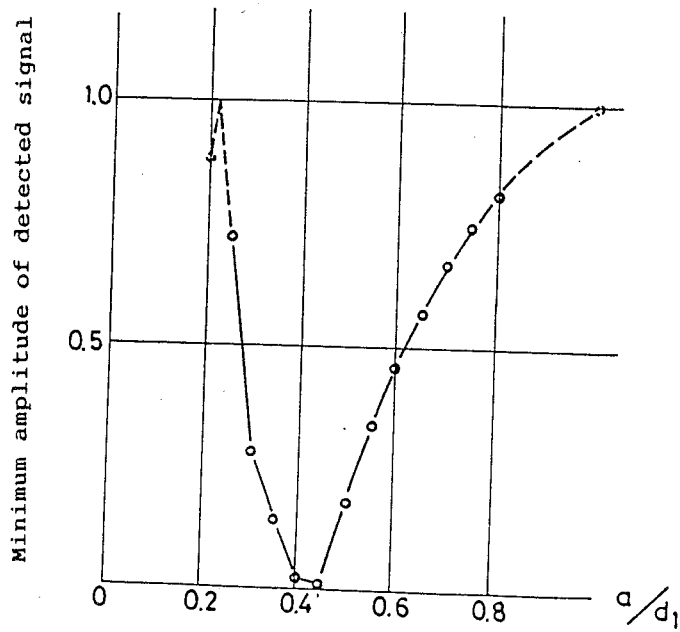
FIG. 6 is a diagram showing a relation between $a/d_1$ and minimum amplitude.

FIG. 6 is a diagram wherein the intensity and the distances of each main maximum are plotted against values of $a/d_1$ by the formulas (1), (2) and (4), and the minimum amplitude of the detected signal when the distance (L) varies are represented as ratios against the intensities of the main maximums of zero-th order. When the minimum amplitude value is large, the difference from the maximum amplitude value is small and the amplitude variation caused by the variation of the (L) is small.

As mentioned above, the laser diode and the collimator lens are used as the light source. And the Fraunhofer diffraction image caused by the great many slits arranged regularly on the transfer slit plate is projected on the fixed slit plate, and thereby the main maximum is detected. Thus fringes between brightness and darkness having good distinctness can be detected and miniaturization and superior resolution can be easily obtained. Further, by making the width of the periodic slit on the transfer slit plate ½ or more of the slit distance of the transfer slit plate, the ratio of the intensity of the first or higher order main maximum against the intensity of the zero-th order main maximum can be decreased. Therefore, a stable detected signal is obtained against the variation of the distance between the transfer slit plate and the fixed slit plate. And, miniaturization and high resolution are easily obtainable.

Further, by establishing the laser light source such that the ratio of the focal length of the collimator lens to the size of the laser diode light source is smaller than the ratio of ½ of the distance between the periodic slits on the transfer slit plate to the distance between the transfer slit plate and the fixed slit plate, the dilution of the Fraunhofer diffraction image can be decreased and brightness and darkness fringes of superior clearness are obtainable. Therefore, miniaturization and high resolution are easily obtainable.

Further, when the Fraunhofer diffraction image is projected on the fixed slit plate in a manner such that the distance between the main maximum of zero-th order and the main maximum of first order is about an integral times the slit distance ($d_1$), the distance between the transfer slit plate and the fixed slit plate can be increased without deteriorating the amplitude of the brightness and darkness of fringes of the Fraunhofer diffraction image. Therefore, the adverse effect of dust or the like between the transfer slit plate and the fixed slit plate is minimized; hence, stains and damage on the slits and the resultant short life of the slit plate can be minimized. Thus, miniaturization and high resolution are easily obtainable. The distance between the transfer slit plate and the fixed slit plate can be set precisely in practical use by considering only the distance between the main maximum of zero-th order and the main maximum of first order. Therefore, the distance between the transfer slit plate and the fixed slit plate can be easily determined.

When the Fraunhofer diffraction image is projected on the fixed slit plate in a manner such that the distance between the main maximum of zero-th order and the main maximum of first order is equal to an integer times the slit distance ($d_1$), the variation of the detected signal caused by the variation of the distance between the transfer slit plate and the fixed slit plate is allowed to be as large as possible. Therefore, the influence of the distance between the transfer slit plate and the fixed slit plate can be minimized and miniaturization and high resolution are easily obtainable. When the Fraunhofer diffraction image is projected so that the main maximum of zero-th order to (n)-th order are within the slit of the fixed slit plate, the amplitude of the brightness and darkness fringes of the Fraunhofer diffraction image is converted, to the utmost, to the amplitude of the detected signal. Therefore, a larger amplitude of the detected signal is obtained and miniaturization and high resolution are easily obtainable.

Instead of the above-mentioned embodiment wherein the upper slit plate moves and the lower slit plate is fixed, the configuration may be modified such that the lower slit plate moves.

Further, instead of the fixed slit plate in the above-mentioned embodiment, the fixed slit plate can be eliminated by using an optical sensing element which has a sensing width corresponding to the slit width of the fixed slit plate.

Further, instead of the laser diode and the collimator lens used as the light source in the above-mentioned embodiments, any laser light source capable of emitting a parallel light beam can be used.

Figure 7:
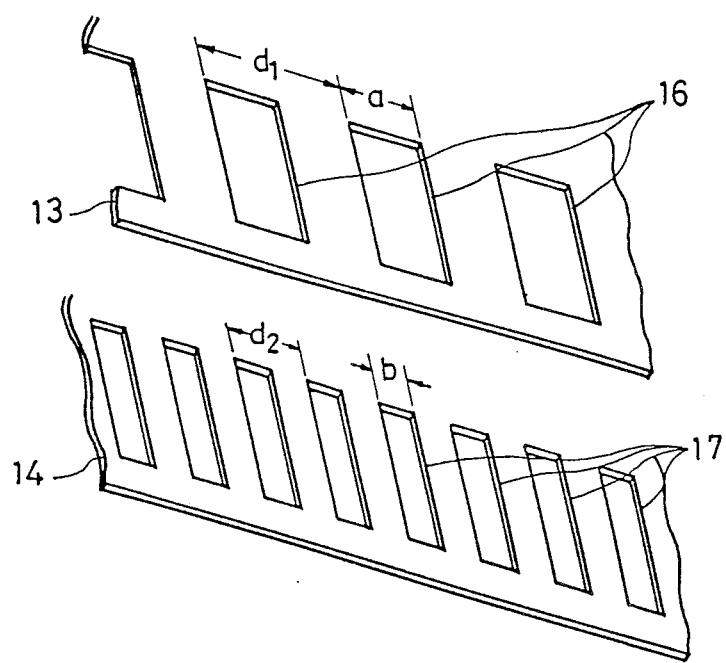
FIG. 7 is an enlarged perspective view showing a slit part of the position detecting device of an embodiment of the present invention.
Figure 8:
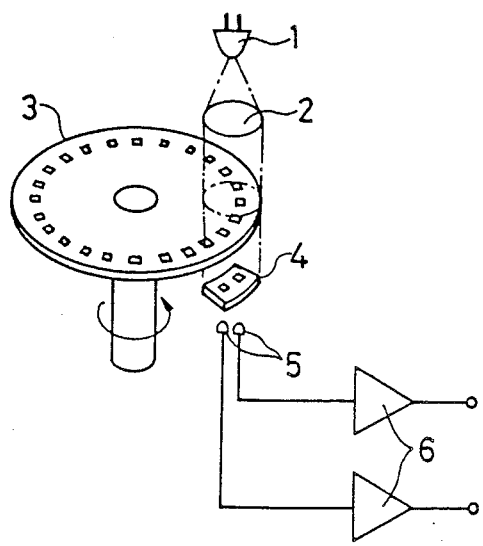
FIG. 8 is a perspective view showing a conventional photoelectric type encoder.
Figure 9:
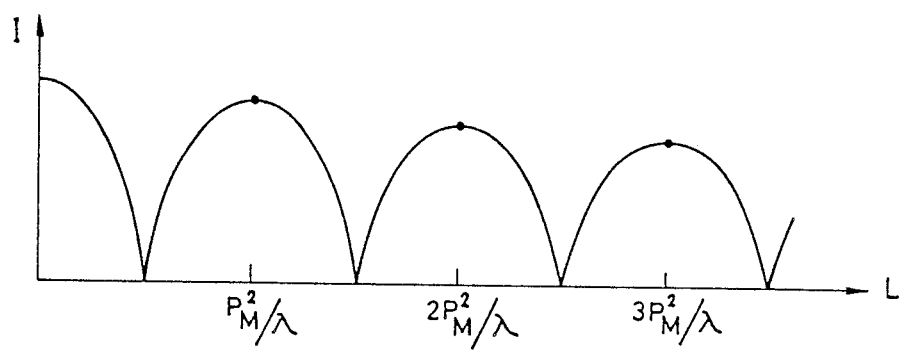
FIG. 9 is a diagram showing a relation of an amplitude of the detected signal against a distance between two slit planes each having the same grating constant.

A second embodiment of the present invention is described as follows referring to FIG. 1 and FIG. 7.

In the position detecting device shown in FIG. 1, the Fraunhofer diffraction image of the slit 16 is projected on the fixed slit plate 14. As shown in FIG. 7, a great many slits having a width (b) are arranged on the fixed slit plate 14 at intervals of a distance ($d_2$) which is 1/{integer} of the distance ($d_1$). The light penetrates the slits 17 and is obstructed at other parts of the plate. The penetrating light is radiated on the light sensing element 15.

When the distance between the main maximums of the Fraunhofer diffraction image projected on the fixed slit plate 14 is equal to an integer times the distance ($d_2$) of the slits 17 of the fixed slit plate 14, and further the width of the main maximum does not exceed ½ of the distance ($d_2$) of the slit 17, the amplitude of the detected signal issued from the light sensing element 15 becomes maximum when moving the transfer slit plate 13.

Then, when the distance between the main maximum of zero-th order and the main maximum of first order of the Fraunhofer diffraction image is $M_1 d_1$ (wherein $M_1$ is a positive integer), the width of the main maximum is given by $$w = \frac{2 M_1 d_1}{N}. \tag{17}$$

When the distance ($d_2$) of the slit 17 of the fixed slit plate 14 is $d_1/M_2$ (wherein $M_2$ is a positive integer), the amplitude of the detected signal is large enough under the conditions of $$w \leq \frac{d_2}{2}, \tag{18}$$

namely, $$4 M_1 M_2 \leq N \tag{19}$$

As one example, when $M_1 = 1$, $$M_2 \leq \frac{N}{4}. \tag{20}$$

That is, even when the distance ($d_2$) of the slits 17 of the fixed slit plate 14 becomes as small as $4/N$ of the distance ($d_1$) of the slit 16 on the transfer slit plate 13, the amplitude of the detected signal is large enough. Therefore, a resolution capacity as high as $N/4$ times the case where $d_1 = d_2$ is obtainable.

At this time, the distance L between the transfer slit plate 13 and the fixed slit plate 14 is given as $$L = \frac{d_1^2}{\lambda}, \tag{23}$$

by making $m = 1$ (21)

and $$\sin \theta_2 \approx \tan \theta_2 = \frac{d_1}{L} \tag{22}$$

in the formula (8).

Therefore, under the condition of the formula (19), the distance L is given as $$L = M_1 \cdot \frac{d_1^2}{\lambda}. \tag{24}$$

Thus, the resolution can be improved without making narrow the distance between the transfer slit plate 13 and the fixed slit plate 14.

As mentioned above, by using the laser diode and the collimator lens as the light source, and a fixed slit plate disposed so that the distance between the main maximum of zero-th order and the main maximum of first order of the Fraunhofer diffraction image caused by the periodic slits of the transfer slit plate is an integer times the distance of the periodic slits, and where the slit distance of the fixed slit plate is 1/{integer} of the slit distance of the transfer slit plate and is twice or more than the width of the main maximum of the Fraunhofer diffraction image caused by the periodic slit of the transfer slit plate, high resolution is obtained without damaging the amplitude of the brightness and darkness fringes of the Fraunhofer diffraction image. Therefore, miniaturization and high resolution can be easily obtained without decreasing the distance between the transfer slit plate and the fixed slit plate.

In the above embodiment wherein the upper slit plate moves and the lower slit plate is fixed, the configuration may be modified such that the lower slit plate moves.

Further, instead of the fixed slit plate in the above-mentioned embodiment, the fixed slit plate can be eliminated by using a light sensing element having a sensing width corresponding to the slit width of the fixed slit plate.

Further, the laser diode and the collimator lens are used as the light source but any laser light source which emits parallel light can be used.

According to the present invention, a high quality parallel light beam is obtainable by the laser light source and the collimator lens, and a large main maximum of zero-th order of the Fraunhofer diffraction image of the periodic slits, which is caused by the laser light coherence, is obtainable. Therefore, the clearness of the brightness and darkness fringes increases and the brightness part becomes sharp and beam-shaped. Further, by disposing the two slit plates at a distance such that the distance between the main maximum is made equal to the slit distance, the adverse influence induced by a distance variation or a wrong distance setting between the two plates can be minimized. Accordingly, the life of the slit plate can be made long and miniaturization and high resolution are easily obtained.

Further, according to the present invention, by obtaining a large main maximum of zero-th order of the Fraunhofer diffraction image of the periodic slits, the brightness portion of the image becomes a narrow, sharp beam-like shape. Further, by disposing the two slit plates in a manner such that the distance between the main maximums becomes equal to the slit distance and, by making the distance between the periodic slits of the slit plate at the light sensing device side 1/{integer} of the distance between the periodic slits of the slit plates at the light source and twice or more of the width of the main maximum, high resolution can be obtained only by making the slit distance of the periodic slits of the slit plate on the light sensing device side without necessitating a decrease of the distance between the two slit plates. Therefore, miniaturization and high resolution are obtainable.

Although the invention has been described in its preferred form with a certain order of particularity, its is to be understood that the present disclosure of the preferred form may be changed in the details of construction and the combination and arrangement of parts without departing from the spirit and the scope of the invention as hereinafter claims.

What is claimed is:

1. A detector for a photoelectric position encoder comprising:
a laser light source emitting parallel, coherent light;

first slit means having at least two first periodic slits, and disposed at a position where said parallel, coherent light is emitted;

second slit means, having at least two second periodic slits, for receiving and passing only light having a same phase difference as an interference image caused by diffraction of light passing said first periodic slits on said first slit means; and a light sensing device disposed at a position for receiving and detecting an amount of all diffracted light having all phase differences diffracted by and passing through said second slit means and superimposed thereon.

2. A detector according to claim 1, wherein a slit width (a) of each of said first periodic slits is $(a) \geq d_1/2,$ wherein $d_1$ is a period of said first periodic slits.

3. A photoelectric position detector comprising:
a laser light source emitting a parallel, coherent light;
first slit means having at least two first periodic slits and disposed at a position where said parallel, coherent light is emitted;
second slit means having at least two second periodic slits and disposed for having an interference image due to diffraction of light passing said first periodic slits on said first slit means projected thereon, intervals of said second periodic slits being equal to a distance between main maximums of said interference image;
a light sensing device disposed at a position for receiving and detecting an amount of all diffracted light having all phase differences diffracted by and passing through said second slit means and superimposed thereon; and
circuit means for issuing a position signal corresponding to a position of one of said slit means, based on the output signal of said light sensing device.

4. A position detector according to claim 3, wherein a slit width (a) of each of said first periodic slits is $(a) \geq d_1/2,$ wherein $d_1$ is a period of said first periodic slits.

5. A photoelectric position detector comprising:
a laser light source emitting a parallel, coherent light beam and comprising (a) a light source part having a width S, and (b) a collimator leans of focal length F, said light source being disposed at a focal point of said collimator lens;
first slit means having at least two first periodic slits and disposed at a position where said parallel, coherent light beam is emitted;
second slit means having at least two second periodic slits and disposed for receiving and passing only light having a same phase difference as an interference image caused by diffraction of light passing said first periodic slits on said first slit means;
a light sensing device disposed at a position for receiving and detecting an amount of all diffracted light having all phase differences diffracted by and passing through said second slit means and superimposed thereon; and
circuit means for issuing a position signal corresponding to a position of said first slit means based on the output signal of said light sensing device;
a ratio of S/F being $S/F \leq d_1/2L,$ wherein $d_1$ is a slit period of the at least two first periodic slits of said first slit means, and L is a distance between said first slit means and said second slit means.

6. A position detector according to claim 5, wherein said laser light source comprises a laser diode.

7. A position detector according to claim 5, wherein said distance L is predetermined such that a period between a main maximum of zero-th order and main maximum of first order of said interference image is within a range from an integer times the slit period to $+b/2$, where b is a slit width of said light sensing device.

8. A position detector according to claim 7, wherein said distance L is predetermined such that a period between said main maximum of zero-th order and said main maximum of first order is equal to an integer times the slit period distance.

9. A position detector according to claim 5, wherein said distance L is predetermined such that a period between a main maximum of zero-th order and a main maximum of (n) order (n=1, 2, ...) of said interference image is within a range from an integer times the slit period to $+b/2$, where b is a slit width of said light sensing device.

10. A position detector according to claim 5, wherein a width (a) of each slit is $(a) > d_1/2.$ 11. A photoelectric position detector comprising:
a laser light source emitting a parallel, coherent light beam;
first slit means having at least two first periodic slits and disposed at a position where said parallel, coherent light beam is emitted;
second slit means having at least two second periodic slits and disposed for receiving a projection of an interference image caused by diffraction of light passing said first periodic slits on said first slit means, intervals between said at least two second periodic slits being equal to a distance between main maximums of said interference image;
a light sensing device disposed at a position for receiving and detecting an amount of all diffracted light having all phase differences by and passing through said second slit means and superimposed thereon; and
circuit means for issuing a position signal corresponding to a position of one of said slit means based on the output signal of said light sensing device,
a distance L between said first slit means and said second slit means being determined by:

$L = M \cdot (d_1)^2 / \lambda,$ wherein M is an integer, $d_1$ is an interval between said first periodic slits and $\lambda$ is a wavelength of said laser light source.

12. A position detector according to claim 11, wherein said light source comprises a laser diode.

13. A position detector according to claim 11, wherein
an interval between said second periodic slits on said second slit means is equal to a period between a main maximum of zero-th order and a main maximum of first order of said interference image of said first periodic slits.

14. A position detector according to claim 11, wherein a slit width (a) of each of said first periodic slits is (a)$\geq d_1/2$, wherein $d_1$ is a period of said first periodic slits.

15. A photoelectric position encoder comprising:

a laser light source emitting a parallel, coherent light beam and comprising (a) a light source part having a width S, and (b) a collimator lens of focal length F;

first slit means having at least two first periodic slits and disposed at a position where said parallel, coherent light beam is emitted;

second slit means having at least two second periodic slits and disposed for receiving a projection of an interference image caused by diffraction of light passing said first periodic slits on said first slit means, intervals between said second periodic slits being equal to a distance between the main maximums of said interference image;

a light sensing device disposed at a position for receiving and detecting an amount of light passing said second slit means; and said light sensing device (a) sensing a variation of the received light amount caused by movement of said second slit means, and (b) sensing brightness and darkness fringes of said interference image caused by the at least two first periodic slits and the second periodic slits;

a slit period $d_1$ of the at least two first periodic slits of the first slit means and a slit period $d_2$ of the at least two second periodic slits of the second slit means are predetermined such that $d_1 > d_2$ and $d_2 = d_1/n$ (n: integer), and a ratio of S/F being S/F$\leq d_1/2L$, wherein L is a distance between said first slit means and said second slit means, said distance L being predetermined to cause a width of a main maximum of said interference image to be not more than ½ of said slit period $d_2$; and circuit means for issuing a position signal corresponding to a position of one of said plates based on said output signal of said light sensing device.

16. A position encoder according to claim 15, wherein said light source comprises a laser diode.

17. A position encoder according to claim 15, wherein said distance L is predetermined such that a period between a main maximum of zero-th order and a main maximum of first order of said diffraction image is within a range from an integer times said slit period $d_1$ to $\pm b/2$, where b is a slit width of said periodic slits of said second slit means.

18. A position encoder according to claim 17, wherein said distance L is predetermined such that a period between said main maximum of zero-th order and said main maximum of first order is equal to an integer times said slit period $d_1$.

19. A position encoder according to claim 15, wherein said distance L is predetermined such that a distance between a main maximum of zero-th order and a main maximum of (n) order (n=1, 2, ...) of said interference image is within a range from an integer times the slit period $d_1$ to $\pm b/2$, where b is a slit width of the periodic slits of said second slit means.

20. A position encoder according to claim 15, wherein a slit width (a) of the periodic slits of said first slit means is (a)$\geq d_1/2$.

* * * * *